United States Patent

[11] 3,573,664

[72] Inventor Don M. Jacob
7912 Cowan Ave., Los Angeles, Calif.
90045

[21] Appl. No. 846,657
[22] Filed July 29, 1969
[23] Division of Ser. No. 726,118, May 2, 1968, Pat. No. 3,475,753
[45] Patented Apr. 6, 1971

[54] VOLTAGE CONTROLLED OSCILLATOR CONSISTING OF A BISTABLE MULTIVIBRATOR WITH FEEDBACK CIRCUITS
9 Claims, 8 Drawing Figs.

[52] U.S. Cl. 331/143, 331/144, 331/177,
[51] Int. Cl. H03k 3/02
[50] Field of Search 331/57, 111, 113, 144, 145, 177, 135, 143

[56] References Cited
UNITED STATES PATENTS
3,289,103 11/1966 Campman 331/111
3,351,871 11/1967 Swain 331/135X

*Primary Examiner*—Roy Lake
*Assistant Examiner*—Siegfried H. Grimm
*Attorneys*—Daniel T. Anderson, Frank E. Wattles and Alfons Valukonis

ABSTRACT: A voltage controlled oscillator capable of producing a square-wave pulse repetition frequency, and characterized by a constant-percentage change in square-wave PRF at the output per volt change at the input. The VCO includes a limiter, integrator and Schmitt trigger connected seriatim.

Patented April 6, 1971 3,573,664

3 Sheets-Sheet 1

Don M. Jacob
INVENTOR.

BY Frank Wattles

ATTORNEY

Don M. Jacob
*INVENTOR.*

BY Frank Wattles
ATTORNEY

Patented April 6, 1971 3,573,664

3 Sheets-Sheet 3

Don M. Jacob
*INVENTOR.*

BY Frank Wattles
ATTORNEY

VOLTAGE CONTROLLED OSCILLATOR CONSISTING OF A BISTABLE MULTIVIBRATOR WITH FEEDBACK CIRCUITS

CROSS-REFERENCES TO RELATED APPLICATIONS

This application is a division of application, Ser. No. 726,118, filed May 2, 1968, which is now U.S. Pat. No. 3,475,753.

BACKGROUND OF THE INVENTION

Prior art voltage controlled devices are constructed by connecting an amplifying device, a frequency resonating device, and a limiting device in a series regenerative feedback loop to form a linear oscillator; or by connecting switching elements together with timing networks which turn on and off these switching elements to form a device related to the Eccles--Jordan multivibrator. These circuits generally become complicated and cumbersome when it is desired to produce certain modifications in oscillator behavior by use of modulating signals. This modification of oscillator behavior is required when constructing certain types of altimeters and range measuring devices.

The VCO of the present invention is designed to be used in conjunction with an altimeter and range measuring device wherein a change in altitude varies the phase shift and voltage change at the input to the VCO causing a proportional change in PRF to return the phase shift to its original value.

SUMMARY

In accordance with the present invention, a VCO produces a square-wave PRF having a relatively constant-percentage change in output per volt change at the input over a wide frequency range.

The VCO includes a limiter, integrator, and Schmitt trigger connected seriatim. The limiter is a means for controlling gain of the square-wave signal. The trigger is a bistable multivibrator. The input to the VCO at the limiter is the control voltage and it sets the level of voltage in the limiter. The input to the integrator is connected to the linear output, a square-wave signal being produced at that point.

DESCRIPTION OF THE DRAWINGS

In the drawings:

FIG. 5 shows a schematic block diagram of another specific embodiment of the present readout invention capable of increased accuracy after lock-on;

DETAILED DESCRIPTION OF THE PREFERRED EMBODIMENT

Figure 1:
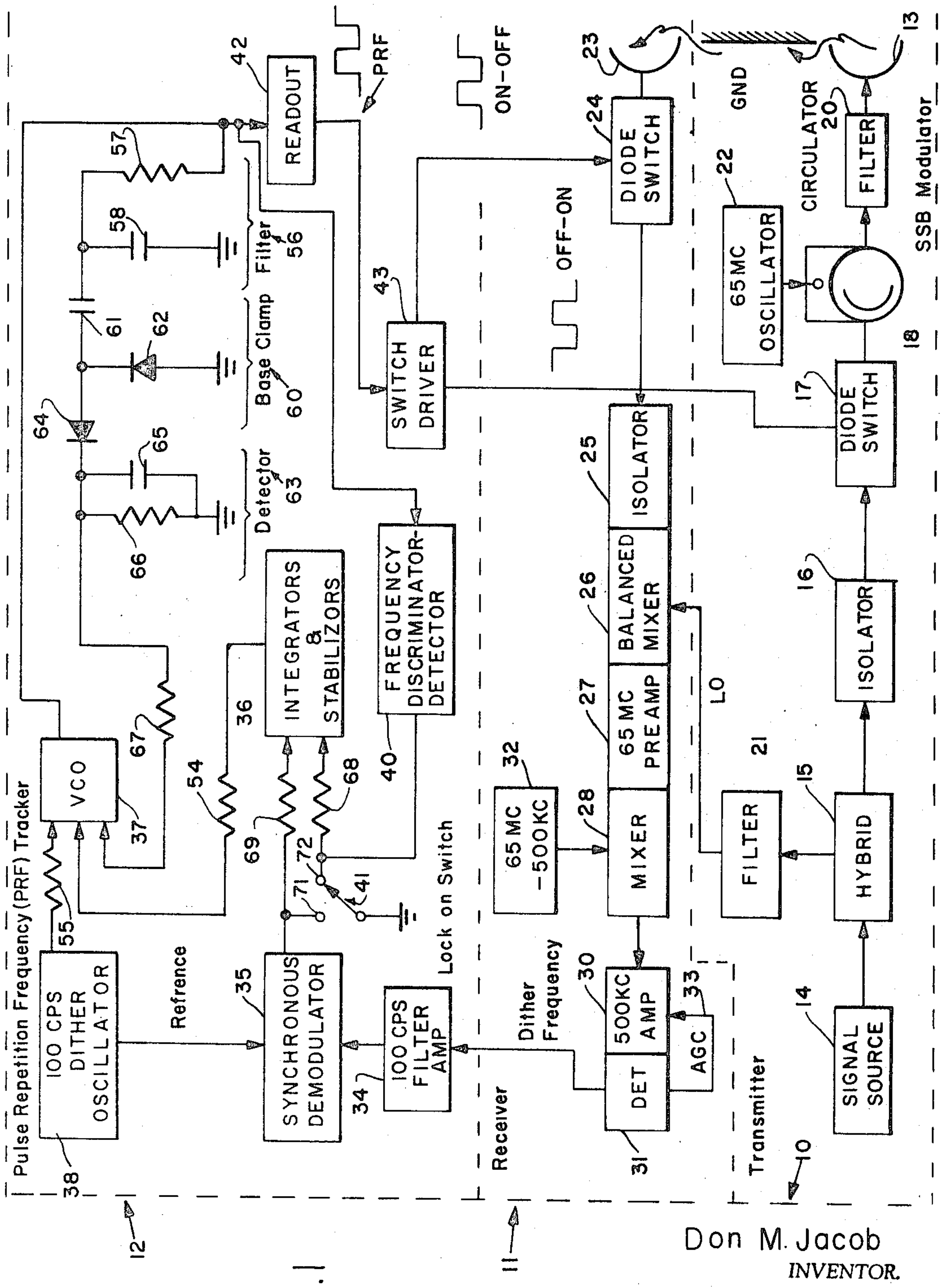
FIG. 1 shows a schematic block diagram of a specific embodiment of the present altimeter invention.

The simplified block diagram of FIG. 1 illustrates the solid state altimeter. The altimeter comprises a transmitter 10, a receiver 11 and a pulse repetition frequency (PRF) tracking loop 12 electrically connected to the transmitter 10 and receiver 11. Transmitter 10 includes a transmitter antenna 13 and a signal source 14. The transmitted signal is derived through a hybrid circuit 15, an isolator 16, a diode switch 17, a single-sideband modulator (SSB) 18, and a filter 20 interconnected seriatim intermediate the signal source 14 and transmitter antenna 13. Hybrid 15 has one input connected to signal source 14 and a pair of outputs connected respectively to isolator 16 and a filter 21 intermediate transmitter 10 and receiver 11. The electrical path through the filter leads into the receiver 11 and PRF tracking loop 12 providing a means for mixing and comparing the signal of source 14 with the transmitted signal reflected into the receiver 11. The mixed and compared signals are processed, the PRF tracking loop 12 providing a certain square-wave to the input of switch 17. The remaining input of switch 17 is connected to the output of isolator 16 from which the signal of source 14 is directly received. Switch 17 will alternately be conducting or nonconducting in response to the square-wave signal from tracking loop 12. SSB modulator 18 has a ferrite circulator and two inputs and an output. One input is connected to oscillator 22 and the other input is connected to switch 17. During the conducting period of switch 17, the signal from signal source 14 is received in modulator 18 and is combined with the signal from oscillator 22 to produce an offset frequency signal. The input and output of filter 20 are connected respectively to modulator 18 and antenna 13. The offset signal is filtered and then transmitted from antenna 13. Filter 20, the ferrite circulator in modulator 16 and filter 21 each isolates the transmitted signal from potential feedback into the circuitry of receiver 11. Where such feedback is not troublesome to operation, all of or any one of the four isolation circuits mentioned may be omitted. Also, where frequency offset of the transmitter signal is not necessary oscillator 22 may be omitted. It is not necessary that the signal from source 14 be gated before SSB modulation, but rather subsequent gating can be provided by locating switch 17 intermediate modulator 18 and antenna 13.

Receiver 11 includes a receiver antenna 23, a diode switch 24, an isolator 25, a balanced mixer 26, a preamplifier 27, a mixer 28, an amplifier 30, and a detector 31 connected seriatim and an oscillator 32 connected to supply a signal to mixer 28. Switch 24 has two inputs connected to respectively antenna 23 and the output of PRF tracking loop 12. The output of loop 12 is a square-wave signal which causes switch 24 to switch alternately between conducting and nonconducting states. Balanced mixer 26 has two inputs connected to respectively isolator 25 and filter 21. During the conducting period of switch 24, the signal received of antenna 23 is transmitted through switch 24 and isolator 25 to mixer 26 upon one input. At the other input the signal from source 14 directed through filter 21 is received. The receiver antenna signal and signal from source 14 are combined in mixer 26 and the frequencies equivalent to those of source 14 cancelled. Mixer 28 has two inputs connected to respectively preamplifier 27 and oscillator 32. Preamplifier 27 amplifies the uncancelled signals from the mixer 26 of a frequency in the order of those generated by oscillator 22 and the signal is received at one input to mixer 28. Oscillator 32 generates a signal of a frequency on the order of that generated by oscillator 22 and amplified in preamplifier 27, but also generates a lower carrier frequency and these signals are received at the other input to mixer 28. The signal frequency from oscillator 22 is cancelled by mixer 28 by the identical frequency signal from oscillator 32. Amplifier 30 has an input connected to mixer 28 and amplifies the remaining signal.

Detector 31 has an input connected to amplifier 30 and detects a relatively very low-frequency dither modulation generated in PRF tracking loop 12. A feedback loop 33 from detector 31 to amplifier 30 is provided as an automatic gain control (AGC).

Figure 2:
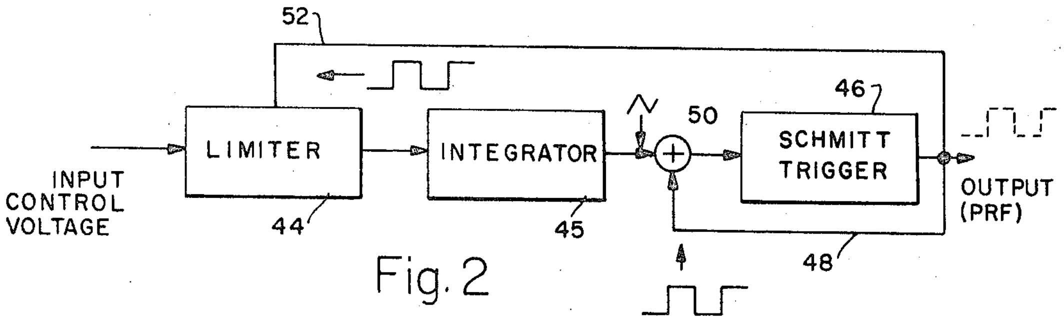
FIG. 2 shows a schematic block diagram of a specific embodiment of the present voltage controlled oscillator invention.
Figure 3:
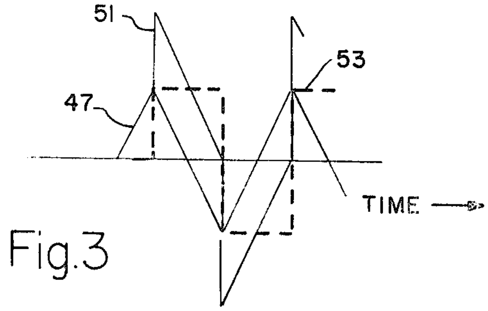
FIG. 3 illustrates waveforms appearing at various points in the diagram shown in FIG. 2.

The PRF tracking loop 12 includes a filter amplifier 34 and synchronous demodulator 35 interconnected through integrators and stabilizer 36 to a voltage controlled oscillator (VCO) 37. A relatively very low frequency on the order of 100 c.p.s. generated by dither oscillator 38 provides a reference signal to demodulator 35 and a signal to VCO 37. Frequency discriminator and detector 40 is provided in a feedback loop connecting the output of VCO 37 with an input to integrators and stabilizers 36. A lock-on switch 41 is connected between ground and both inputs to integrators and stabilizers 36. A range readout 42 is provided at the output of VCO 37 and connects seriatim a switch driver 43. Filter amplifier 34 connects the output of detector 31, and both filters and amplifies the detected dither modulated signal. Synchronous demodulator 35 has two inputs connected respectively to the output of filter amplifier 34 and to one output of dither oscillator 38. Integrators and stabilizers 36 have two inputs connected respectively to the output of demodulator 35 and to one terminal of lock-on switch 41. The demodulated signal from demodulator 35 controls the PRF through microminiaturized electronic integrators 36 used to reduce dynamic tracking errors. In an operating device two integrators were used. VCO 37 has two inputs connected respectively to the output of integrators and stabilizers 36 and to an output of dither oscillator 38. For this altimeter to obtain a high degree of range coverage the VCO 37 must demonstrate a relatively constant-percentage change in square-wave PRF at the output per volt change at the input over the wide range of frequency. A VCO capable of producing a square-wave PRF with these characteristics over a limited range of frequency is shown in FIG. 2. The VCO includes a limiter 44, integrator 45 and Schmitt trigger 46 connected seriatim. The limiter 44 is a means for controlling gain of the square-wave signal. Any equivalent circuit could be substituted for limiter 44, for example, an amplifier with AGC control. The trigger 46 is a bistable multivibrator. The input to the VCO at the limiter 44 is the control voltage and it sets the level of voltage in limiter 44. The input to integrator 45 is connected to the limiter output, a square-wave signal being produced at that point. The output of integrator 45 carries a triangular wave 47, as shown in FIG. 3. The output of trigger 46 is a square-wave voltage. The square-wave output is returned on feedback loop 48 and compared with the output of integrator 45 at adder 50 and the added signal 51 (FIG. 3) is received at the input to trigger 46. The output of trigger 46 also is returned on feedback loop 52 to an input of limiter 44. The resultant square-wave PRF output 53 is shown in FIG. 3. The model of VCO employed in development experiments used an integrated microcircuit limiter manufactured by Motorola and a Fairchild Model 703A integrator in parallel with a capacitor and a Fairchild microcircuit Schmitt trigger as limiter 44, integrator 45 and trigger 46, respectively. A resistor was added connecting the output of limiter 44 with the input of integrator 45. The dither oscillator signal is not shown in FIG. 2 because dithering is not necessary to the operation of the VCO, being used primarily where stabilization is required. The dither signal input would be made to limiter 44. Other forms of VCO were used with varying success. In FIG. 1, the output of integrators and stabilizers 36 is connected to one input of VCO 37 through resistor 54. The output of dither oscillator 38 is connected to one input of VCO 37 through resistor 55. Resistors 54 and 55 are necessary only to the extent they are needed to accommodate certain current and voltage values in VCO 37. Another optional circuit in conjunction with VCO 37 and substituted for feedback loop 52 is a feedback loop between the output and input of VCO 37, the loop comprising a filter 56 formed by a series connected resistor 57 and capacitor 58 leading to ground, a base clamp 60 formed by a series connected capacitor 61 and diode 62 leading to ground, a detector 63 formed by a series connected diode 64 and parallel resistor 65 and capacitor 66 leading to ground, and a resistor 67. The filter 56, base clamp 60, detector 63 and resistor 67 are connected seriatim in the feedback loop. In the case where the VCO 37 percentage change in square-wave PRF at the VCO output per volt change at the input is satisfactory over a certain frequency, the optional feedback loop is not necessary. The feedback loop is provided to extend the frequency range over which there is a relatively constant-percentage change in PRF at the VCO 37 output per volt change at the input. Another feedback loop is provided connecting the output of VCO 37 with one input of integrators and stabilizers 36, this loop including a frequency discriminator and detector 40 and resistor 68. Resistor 68 and resistor 69, the latter in the connection between demodulator 35 and integrators and stabilizers 36, are provided to accommodate, where necessary, certain current and voltage values at the input to integrators and stabilizers 36. Each of the two inputs to integrators and stabilizers 36 is connected to terminals 71 and 72, respectively, of lock-on switch 41 and a third terminal 73 is at ground potential. Switch 41 has two positions. With the switch contact set on terminal 71 the demodulator output is at ground potential and switch 41 is in initial frequency set before lock-on position. With the switch contact set on terminal 72, the output of detector 40 is at ground potential and switch 41 is in operate (lock-on) position. Range readout 42 has its input connected to the output of VCO 37. The readout provides a means for display of the altitude in feet. Two embodiments of the readout 42 hereinafter are described. Switch driver 43 input is connected to the output of readout 42. Driver 43 has two outputs connected to diode switch 17 and diode switch 24, respectively. The square-wave PRF signal received at the input of switch 43 is used to cause the output to switch 24 to be 180°out of phase with the output to switch 17. In this manner, switch 17 will be conducting (on) when switch 24 is nonconducting (off) and vice versa.

Figure 4:
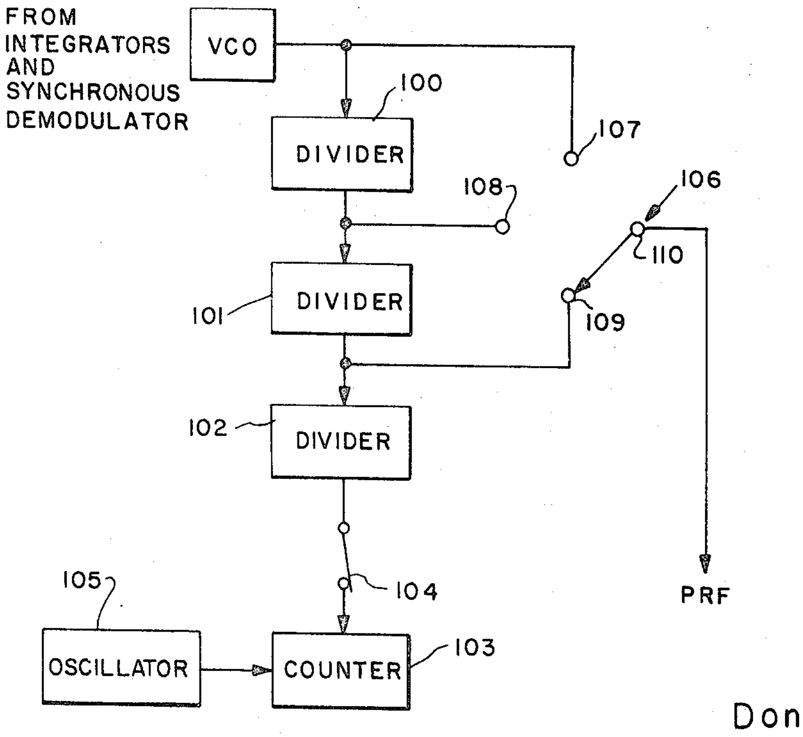
FIG. 4 shows a schematic block diagram of a specific embodiment of the present readout invention.

One embodiment of a range readout 42 is shown in FIG. 4. The readout 42 includes a divider chain having a first divider 100, a second divider 101, and a third divider 102 and a counter 103 connected seriatim. Dividers 100, 101, 102 typically divide by a factor of 10, although any factor of division may be employed. Any number of dividers as may appear appropriate may be employed. An on-off switch 104 between the dividers and counter 103 provides means for starting or stopping the operation of the counter 103 as desired. Means are provided, such as an oscillator 105 connected to an input to counter 103, for driving counter 103 with a certain frequency signal to be used as a reference in comparison with the PRF being counted. In operation, the PRF can be used to switch the counter 103 ON or OFF at the rate of PRF by causing the switch 104 to be ON or OFF, respectively. When the counter 103 is ON, the oscillator 105 supplies a frequency which is counted in the counter 103 and displayed as altitude or range. When the counter 103 is OFF, the oscillator 105 frequency is not counted in the counter 103. Readout 42 provides a means to monitor range or PRF. The usual techniques would not successfully and directly monitor range because it is inversely proportional to PRF. The readout 42 also includes a selector switch 106 having three selector positions at terminals 107, 108, 109, respectively. The output terminal 110 is connected to the input to switch driver 43 and is referred to herein as the output of readout 42. Terminal 107 is connected to the output of VCO 37, terminal 108 is connected to the output of divider 100, and terminal 109 is connected to the output of divider 101. With the selector switch 106 set on terminal 107, the readout 42 would be adjusted to indicate the low range of altitudes at which the PRF is highest. Switch 106 set to terminal 108, the readout 42 will indicate the intermediate range of altitudes at an intermediate PRF, and set at terminal 109, readout 42 will indicate the high range of altitudes at a low PRF. Typically, the low range of altitudes is approximately 8 feet to 300 feet, the intermediate range 300 feet to 3,000 feet and the high range 3,000 feet to 30,000 feet where the output of VCO 37 ranges between 30 MHz. to 800 kHz. Of course, the type of device that is used to display altitude will direct the type of circuitry to be used in conjunction therewith. A particular display may not require a divider chain, the display device directly receiving the VCO 37 output signal. In some cases, a readout 42 will not be required and the PRF used in a recorder of other device.

Figure 5:
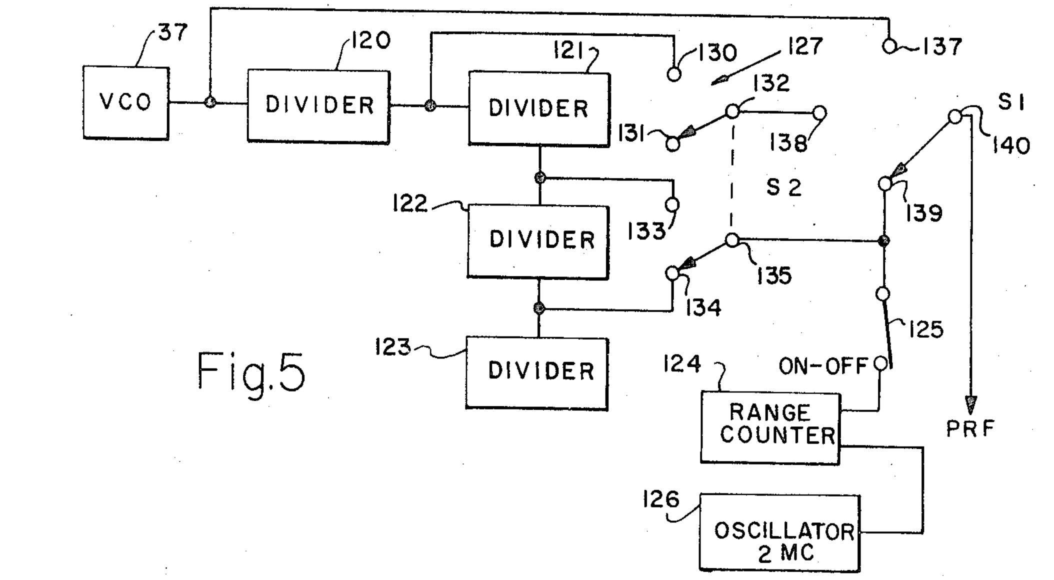

A second embodiment of a range readout 42 capable of increased range instrumentation accuracy after lock-on is shown in FIG. 5. The readout 42 includes a divider chain having a first divider 120, a second divider 121, a third divider 122, and a fourth divider 123, and a counter 124 connected seriatim. Dividers 120 and 121 and dividers 122 and 123 typically divide by a factor of 10, although any factor of division may be employed. Dividers 120 and 122 typically divide by a factor of two and dividers 121 and 123 typically divide by a factor of five. Any number of dividers as may appear appropriate may be employed. An on-off switch 125 between the dividers and counter 124 provides means for starting or stopping the operation of the counter 124 as desired. Means are provided, such as an oscillator 126 connected to an input to counter 124, for driving counter 124 with a certain frequency signal to be used as a reference in comparison with the PRF being counted, the operation of this embodiment being identical with the first readout embodiment described above, insofar as the PRF, counter, switch and oscillator are functionally interrelated. The readout 42 also includes a selector switch 127 and a selector switch 128, the former having input terminals 130 and 131 and output terminal 132, and the latter having input terminals 133 and 134 and output terminal 135. The contact arms of switches 127 and 128 are mechanically connected to move together so that when switch 127 is set to terminal 130, switch 128 will be set thereby to terminal 133 and likewise for settings to terminal 131 and terminal 134. Terminals 130 and 131 are connected to the outputs of dividers 120 and 121, respectively. Terminals 133 and 134 are connected to the outputs of dividers 122 and 123, respectively. Readout 42 also includes a range switch 136 having input terminals 137, 138, 139, and output terminal 140. Terminal 137 is connected to the output of VCO 37. Terminals 138 and 139 are connected to terminals 132 and 135, respectively. Terminals 135 and 139 are connected through switch 125 to counter 124. Terminal 140 is the output of readout 42. With range switch 136 set on terminal 137 and switches 127 and 128 set on terminals 130 and 133, respectively, the readout is adjusted to indicate the low range of altitudes at which the PRF is highest. Likewise, settings of switch 136 on terminals 138 and 139 will provide intermediate and high range of altitudes. To increase the accuracy by a factor of five for any setting on switch 136, switches 127 and 128 are set on terminals 131 and 134, respectively. Normal tracking, as obtained experimentally, is accurate to 1 percent of the total altitude. Increasing the PRF five times by the last described switch setting, increases accuracy to 0.2 percent if all of the signal reflected into the receiver comes from a point source.

Figures 6, 7, 8:
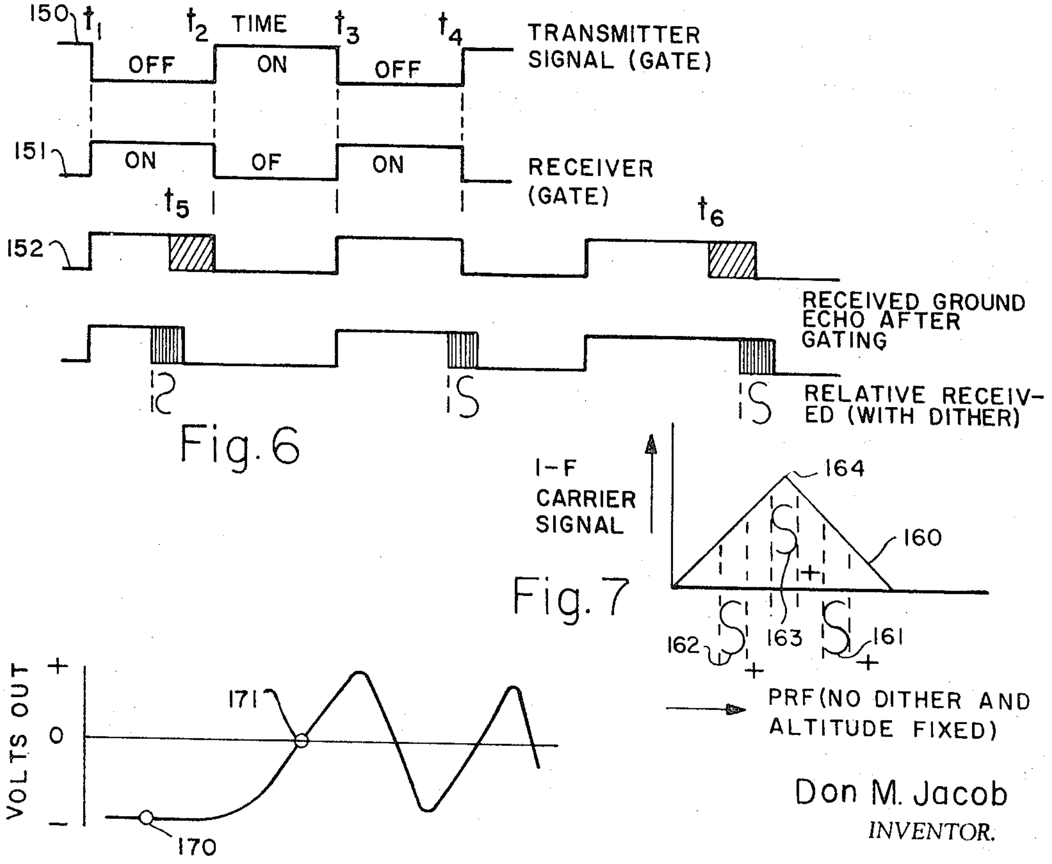
FIG. 6 illustrates gating waveforms appearing in the transmitter and receiver.
FIG. 7 illustrates the effect of gating waveforms and dithering on an IF carrier.
FIG. 8 illustrates the output of synchronous demodulator versus PRF.

In operation, the gating of the signals in the transmitter 10 and receiver 11 is in phase opposition as shown in FIG. 6. Transmitter gating 150 alternates between on-off as receiver gating 151 simultaneously alternates between off-on. There will be a definite transmission time elapsed for a signal to be transmitted, reflected by a target such as the ground and returned to the receiver 11. The phases shift between the transmitted signal and received signal will be a function of the distance from the target, the phase shift increasing in direct proportion to the distance. Briefly, the change in phase shift from 180°produces a change in DC voltage level, either positive or negative, at the output of the demodulator 35 and input to both integrators and stabilizers 36 and VCO 37. As described hereinabove, VCO 37 is designed to have a constant-percentage change in PRF at its output per volt change at the input. Consequently, a change in phase in turn changes the PRF. This altimeter automatically adjusts the PRF to maintain the phase at 180°for any altitude or distance. With the phase held constant for varying distance, and with PRF changing to keep the phase constant, altitude or distance will be a function of PRF, the distance being inversely proportional to PRF.

The received ground echo signal after gating 152 is shown in FIG. 6. The square-wave form represents the envelope of the received signal after gating, the portion of the signal within the envelope being omitted for purposes of illustration. The receiver is ON from time $t_1$ to time $t_2$ and likewise from $t_3$ and $t_4$. The $t_1t_5$ and $t_3$—$t_6$ portions of the signal illustrated as unshaded represent the received signal uncorrected for altitude error, that is with uncorrected phase. The phase is less than 180°. The shaded portions $t_5$—$5_2$ and $t_6$—$t_4$ represent the correction due to a change in PRF, the change correcting the phase to 180°.

PRF tracking with altitude variations is achieved by varying (dithering) the PRF by 10 or 15 percent at a relatively low frequency, for example, approximately 100 c.p.s. The variation of the PRF will change the amplitude of the received RF and IF carrier signals as shown by curve 160 in FIG. 7. Signals 161, 162 and 163 represent dither-modulated signals on the IF carrier. Point 164 represents the maximum amplitude of IF carrier signal and this amplitude will occur where the phase shift is 180° and at a certain PRF, as shown in FIG. 6, 7. Only when the phase is 180° will the voltage at the output of demodulator 35 and the input of VCO 37 be zero. If the phase varies from 180° and the amplitude of IF carrier signal falls below maximum amplitude, the voltage will be a net potential above or below zero. Dithering represented by curve 162 illustrates the case where dithering produces a net voltage below zero, and thereby the PRF output of VCO 37 is increased until that case presented by curve 163 where the net voltage is zero and the PRF output of VCO 37 remains unchanged. Similarly, dithering represented by curve 161 illustrates the case where dithering produces a net voltage above zero, and thereby the PRF output of VCO 37 is decreased until that case represented by curve 163 as above described. Detection of the dither-modulation signal on the IF carrier allows altitude tracking without phase locking the carrier. Also PRF harmonies included in the detected signal will allow altitude tracking.

The error voltage out of the demodulator 35 (assuming an open tracking loop 12 in which switch 73 is set on terminal 71, FIG. 1) is graphically represented in FIG. 8 as a function of PRF at a fixed altitude. Initial lock-on is achieved by slowing the PRF to a value 170 lower than that which would be required to lock on to the ground or target. After the PRF is slowed to this lower PRF value 170, the tracking loop is closed by setting switch 41 on terminal 72 (FIG. 1) and unambiguous lock-on is automatically achieved where the round trip phase-shift of the PRF is 180°, point 171, FIG. 8. If for any reason the PRF should lock onto a higher or an ambiguous lock-point, the readout 42 would indicate a value less than the actual altitude. This feature could be considered a fail-safe provision.

The model utilized in practice operated at a transmitter frequency in the range of 10 GHz. The IF was 65 MHz. through preamplifier 27 and oscillator 32 which also generated 500 kHz. through mixer 28 into amplifier 30 and detector 31. The dither oscillator operated at approximately 100 c.p.s. The short-range accuracy was found to be on the order of 1 foot and the long-range bias error approximately 1 percent up to 30,000 feet. The developed apparatus and method can function equally well at almost any carrier frequency, even that of a laser. The return from rain can be discriminated against by using a suitable filter in the IF. This allows altimeter operation even in heavy rain storms.

While certain embodiments of the invention have been described in detail herein and shown in the accompanying drawings, it will be evident that various additional modifications are possible in the arrangement and construction of its components without departing from the scope of the invention.

I claim:

1. A voltage controlled oscillator for producing a change in the pulse repetition frequency (PRF) at the output of said voltage controlled oscillator due to a voltage change at the input of said voltage controlled oscillator, which comprises:

means at the input for controlling gain;

an integrator connected to the output of said means for controlling gain;

a bistable multivibrator connected to the output of the integrator;

a first feedback loop connecting the output of the multivibrator with an input to the means for controlling gain;

an adder connected intermediate the output of the integrator and an input of the multivibrator; and a second feedback loop connecting the output of the multivibrator with the adder.

2. A voltage controlled oscillator (VCO) as in claim 1 and further comprising:

a filter connected to the output of the VCO;

a base clamp connected to the output of the filter; and a detector connected to the output of the base clamp, the series combination of filter, base clamp and detector positioned within a feedback loop and connecting the output of the VCO with the input of the VCO, the output of the detector being connected to the input of the VCO, said feedback loop and combination of filter, base clamp and detector adapted to produce a PRF at the VCO output which PRF changes at a substantially constant ratio to the voltage change at the VCO input.

3. A voltage controlled oscillator as in claim 2, and further comprising: means connected to the input of the VCO for dithering the VCO at a low frequency relative to the PRF.

4. A voltage controlled oscillator as in claim 3, wherein the filter comprises: a resistor at the filter input; and a capacitor connected in series with the filter resistor, said capacitor having the other terminal grounded.

5. A voltage controlled oscillator as in claim 8, wherein the base clamp comprises:

a capacitor at the base clamp input; and a diode connected in series with the clamp capacitor, said diode having the other terminal grounded, the diode adapted to conduct conventional current in one direction only away from ground potential.

6. A voltage controlled oscillator as in claim 5, wherein the detector comprises:

a diode at the detector input, said diode adapted to conduct conventional current in one direction only toward the detector output;

a resistor; and a capacitor connected in parallel with the resistor, one terminal of the resistor-capacitor combination being grounded and the other terminal connected to the cathode of the diode.

7. A voltage controlled oscillator as in claim 6, and further comprising: a bias resistor at the input of the VCO.

8. A voltage controlled oscillator as in claim 7, wherein the gain control means comprises a limiter.

9. A voltage controlled oscillator as in claim 8, wherein the bistable multivibrator comprises a Schmitt trigger.